Feb. 12, 1952     R. V. BROMLEY     2,585,624
THREAD FOR GLASS CONTAINERS
Filed May 8, 1950

Inventor
Raymond V. Bromley
By
Attorney

Patented Feb. 12, 1952

2,585,624

UNITED STATES PATENT OFFICE 2,585,624

THREAD FOR GLASS CONTAINERS

Raymond V. Bromley, Washington, D. C., assignor to Hazel-Atlas Glass Company, Wheeling, W. Va., a corporation of West Virginia Application May 8, 1950, Serial No. 160,683

5 Claims. (Cl. 215—31)

The invention relates to threads for glass containers with which screw caps are used.

In the sealing of glass containers, such as jars and the like, with screw caps, there is considerable splitting or breakage of the containers, and the main object of the present invention is to provide a glass finish for screw caps by which this splitting or breakage is greatly reduced.

Another object of the invention is to provide such a finish in connection with a continuous glass thread, so that the entire finish comprises a single piece and has the strength and various other advantages of a continuous thread finish, as distinguished from lug finishes, interrupted thread finishes, or other finishes of separate parts.

Various other objects and advantages of the invention will be apparent to those skilled in the art, from the following detailed description, when taken in connection with the accompanying drawing, in which.

Figure 4:
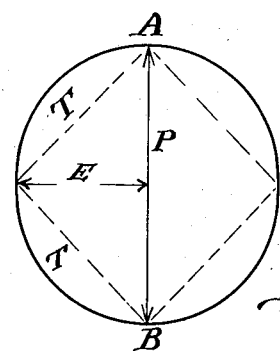
Figure 5:
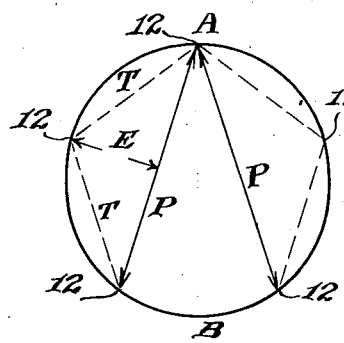

Figure 4 is a diagrammatic illustration of the horizontal expanding forces acting when a screw cap is applied to a container which is out of round and which is provided with a conventional continuous thread finish; and Figure 5 is a similar diagrammatic illustration of the horizontal expanding forces acting when a screw cap is applied to a container which is out of round and is provided with the improved thread finish of the present invention.

In the manufacture of glass jars and other glass containers the finish is always more or less out of round, because when the containers are removed from the molds of forming machines they are in a semi-plastic state.

Breakage of glass containers, in applying screw caps, is largely due to the finish being out of round. Breakage does not ordinarily occur when the finish is only very slightly out of round, but the greater the out of round the greater is the chance of breakage.

Figure 1:
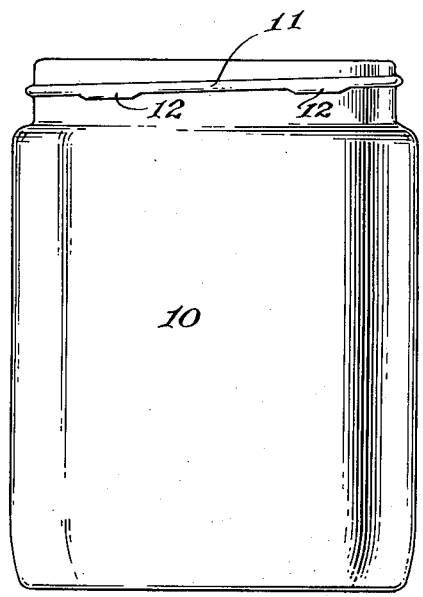
Figure 1 is an elevational view of a glass jar provided with the improved thread finish.

The out of round of glass finishes is usually greater in what are known as square shoulder jars, which lack the reinforcing effect of the conventional transfer bead, and for that reason a square shoulder jar is illustrated in Figure 1. But it is to be understood that the thread finish of the present invention is applicable to and may be used in glass containers of all kinds which are sealed by screw caps.

Also, by reason of the fact that in the present invention a continuous thread is employed with spaced depending portions integral therewith, the out of roundness is minimized in comparison with out of roundness conditions with lug finishes or interrupted thread finishes or other separate part finishes, and of course the one-piece finish of the present invention is stronger and less likely to chip or break, than is the case with a separate parts finish.

Referring now to the drawings, numeral 10 indicates a glass jar having a continuous glass thread 11. At intervals along the thread a number of integral downwardly extending portions or lugs 12, herein termed fulcrum points, are provided, and the bottoms of these depending portions are arranged in a helix. These downwardly extending portions are preferably formed, not by increasing the thickness of the thread at these points, but by decreasing, between these points, the thickness of the conventional thread. Obviously the invention is not limited in this respect.

Figure 2:
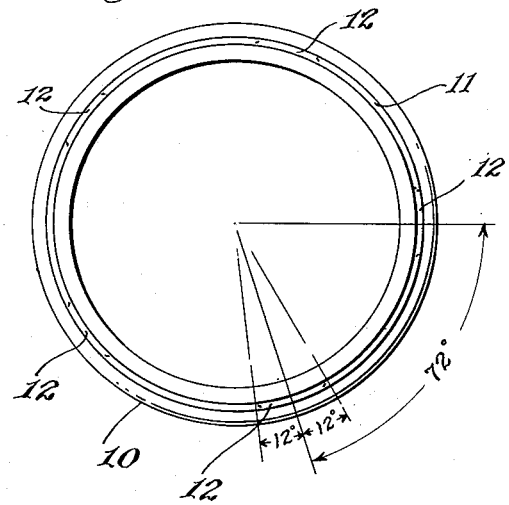
Figure 2 is a plan view of the jar.

In the specific embodiment illustrated there are five of these fulcrum points, and hence no fulcrum point is opposite any other fulcrum point. Also, in the specific embodiment illustrated, the length of each fulcrum point is 24° and they are spaced 72° from center to center, as shown in Figure 2. This specific construction has been found to be best in the specific container illustrated, though of course the invention is not limited to the specific number, size, or arrangement of the fulcrum points. These depending lugs are called fulcrum points because they function in a way as fulcrums for the cap to rock about or adjust itself by flexing between points.

Figure 3:
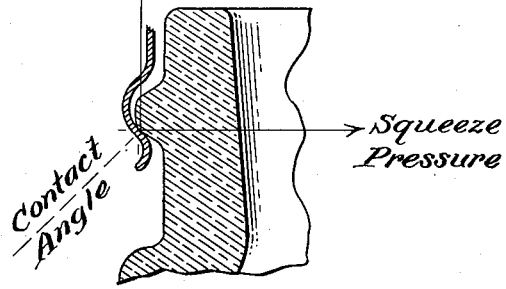
Figure 3 shows, in section, a fragment of a screw cap and the neck of a glass container, and illustrating the components of the force in applying screw caps.

When a screw cap is applied to a container, contact between the thread in the cap and the glass thread on the container is at an angle indicated as the contact angle on Figure 3. The components of the pressure are the vertically acting cap seating pressure, and the horizontally acting squeeze pressure. It is this squeeze pressure which causes breakage, as will be explained by reference to Figures 4 and 5.

Figure 4 illustrates the squeeze action in an out of round finish with a conventional continuous glass thread; the large out of round diameter being indicated by AB, and the small out of round diameter being 90° therefrom. When a cap is applied, with the conventional continuous glass thread, the maximum squeeze occurs at the two opposite points of the largest out of round diameter, that is, at A and B. And this horizontal squeeze pressure or stress is indicated by line P.

This squeeze pressure is converted into an expanding force or strain E through toggle TT. This expanding force creates tension on the outer surface of the finish at the diametrically opposite points of the small diameter of out of round. And it is at one or both of these points where splitting and breakage ordinarily occurs. Infrequently, splitting and breakage occurs on the inside of the finish, and in such instances it is usually at one or both of the diametrically opposite points of the large out of round diameter.

Figure 5 illustrates the squeeze action in an out of round finish with the thread of the present invention; the large out of round diameter being represented by AB, and the small out of round diameter being 90° therefrom. The five lugs or fulcrum points are indicated in this diagrammatic figure by numeral 12.

Obviously with an odd number of fulcrum points, such as five points illustrated herein, no contact point between the screw cap and any lug of the finish is opposite any other contact point. And thus it is apparent that when a cap is applied the horizontal squeeze pressure acts through the two lines PP, each carrying one-half of the total squeeze. This squeeze pressure is converted into an expanding force E through the toggle TT.

So it is apparent that the expanding force is greatly reduced by reason of the odd number of contact points; tests having established that the expanding force, with the conventional thread, is about two and one-half times that of the five fulcrum thread. Thus it is clear that the side squeeze and the resulting expanding force is so greatly reduced that splitting or breakage, due to the finish being out of round, is almost eliminated in the application of screw caps.

While the five point fulcrum thread finish has been mainly referred to herein, yet the invention is not thus limited. In fact, a three point contact, forming an equilateral triangle, is ideal theoretically, but in most instances it is not practical, for it would not effect a sufficiently good seal, as the distance between the points would permit the cap to flex upwardly. And, of course, there might be more than five fulcrum points, but it will be understood that the number of contact points should be low, for as they are increased in number the maximum squeeze points are brought more nearly diametrically opposite. In other words, as the number is increased a closer approach is made to the problem involved in the conventional continuous thread, which problem is solved by the present invention.

So it will be understood that the number of contact points employed is important, and also it is of the greatest importance that they should never be diametrically opposite, for that would permit contact points to be diametrically opposite on the large out of round diameter, and thus produce maximum squeeze or stress and consequently maximum strain or stretch. Such an undesirable construction is avoided in the present invention by the use of an odd number of fulcrum points.

And it will also be understood that by employing these spaced depending portions, integral with a continuous thread, to form a one-piece finish, many of the advantages of an ordinary continuous thread finish are obtained. For example, out of roundness is minimized as compared with lug finishes or any other kind of finish having separate parts, for this continuous glass thread is narrow and is chilled in the neck ring mold, so that it sets very rapidly, and as the continuous thread extends of course entirely around the neck of tie container it aids very considerably in reducing tne out of roundness condition.

And as another example of the advantages of the finish of the present invention, it should be mentioned that the one-piece finish consisting of the continuous thread with spaced depending portions integral therewith, is as strong as the glass container, and will not chip or break away, as is liable to happen with lug finishes or with any other kind of finish having separate parts.

Having fully described the invention, what I claim is:

1. A glass container adapted to be sealed with a screw cap, and a one-piece finish on the container including a continuous glass thread on the neck of the container, and an odd number of evenly spaced depending portions along the continuous thread, said depending portions being integral with the continuous thread and the bottoms of said depending portions being arranged in a helix.

2. A glass container adapted to be sealed with a screw cap, and a one-piece finish on the container including a continuous glass thread on the neck of the container, and an odd number of at least three evenly spaced depending portions along the continuous thread, said depending portions being integral with the continuous thread and the bottoms of said depending portions being arranged in a helix.

3. A glass container adapted to be sealed with a screw cap, and a one-piece finish on the container including a continuous glass thread on the neck of the container, and five evenly spaced depending portions along the continuous thread, said depending portions being integral with the continuous thread and the bottoms of said depending portions being arranged in a helix.

4. A glass container adapted to be sealed with a screw cap, and a one-piece finish on the container including a continuous glass thread on the neck of the container, and five evenly spaced depending portions each of approximately 24° along the continuous thread, said depending portions being integral with the continuous thread and the bottoms of said depending portions arranged in a helix.

5. A glass container adapted to be sealed with a screw cap, and a one-piece finish on the container including a continuous glass thread on the neck of the container, and five evenly spaced depending portions each of approximately 24° along the continuous thread, said depending portions being spaced approximately 72° from center to center, and said depending portions being integral with the continuous thread and the bottoms of the depending portions arranged in a helix.

RAYMOND V. BROMLEY.

REFERENCES CITED

The following references are of record in the file of this patent:

UNITED STATES PATENTS

| Number | Name | Date |
|---|---|---|
| 723,508 | Wilson | Mar. 24, 1903 |
| 1,304,098 | Rivers | May 20, 1919 |
| 1,351,496 | Spooner | Aug. 31, 1920 |
| 2,206,143 | Wainwright | July 2, 1940 |